(12) United States Patent
Yen

(10) Patent No.: US 7,714,841 B2
(45) Date of Patent: May 11, 2010

(54) WIRELESS MOUSE

(75) Inventor: Hong-Che Yen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 908 days.

(21) Appl. No.: 11/428,796

(22) Filed: Jul. 5, 2006

(65) Prior Publication Data

US 2007/0252816 A1 Nov. 1, 2007

(30) Foreign Application Priority Data

Apr. 26, 2006 (TW) .............................. 95114825 A

(51) Int. Cl.
*G06F 3/02* (2006.01)
*G09G 5/00* (2006.01)
(52) U.S. Cl. ...................................... 345/163
(58) Field of Classification Search .......... 345/156–169
See application file for complete search history.

(56) References Cited

U.S. PATENT DOCUMENTS

| 5,260,696 | A | * | 11/1993 | Maynard, Jr. ............... 345/163 |
| 6,157,370 | A | * | 12/2000 | Kravtin et al. .............. 345/163 |
| 6,304,249 | B1 | * | 10/2001 | Derocher et al. ............ 345/163 |
| 7,499,028 | B2 | * | 3/2009 | Eichenberger et al. ....... 345/163 |
| 2003/0184521 | A1 | * | 10/2003 | Sugita ........................ 345/163 |
| 2006/0209025 | A1 | * | 9/2006 | Cheng et al. ................ 345/163 |

* cited by examiner

*Primary Examiner*—Srilakshmi K Kumar
(74) *Attorney, Agent, or Firm*—Apex Juris, pllc; Tracy M Heims

(57) ABSTRACT

A wireless mouse includes a rotatable backdoor, a damper and a clasping member. The backdoor has an engaging element. The damper is mounted onto the lower base and includes a rotary member. When the clasping member is engaged with the engaging element, the backdoor is closed. Due to the rotational resistance provided by the damper, the backdoor can be slowly opened.

6 Claims, 8 Drawing Sheets

WIRELESS MOUSE

FIELD OF THE INVENTION

The present invention relates to a wireless mouse, and more particularly to a wireless mouse having a storable wireless signal receiver and a backdoor, which is easily opened in response to a pushing force exerted on the side wall of the wireless mouse.

BACKGROUND OF THE INVENTION

Nowadays, mice have become essential peripheral devices of computer system. When the wired mouse is used, the wire linkage is very troublesome and inconvenient because an additional signal wire is employed to connect the computer with the mouse. As a consequence, wireless mice have experienced great growth and are rapidly gaining in popularity because no signal wires are required when they are operated. Especially, the users who often carry the notebook computers favor the wireless mice.

Typically, when the wireless mouse is operated, a corresponding wireless signal receiver is used for receiving the wireless signal issued from the wireless mouse. The wireless signal receiver is usually plugged into a slot of the computer. If the wireless mouse and the wireless signal receiver are separately stored, the probability of losing either the wireless mouse or the wireless signal receiver is increased. For a purpose of solving such a problem, a wireless mouse having a storage structure for storing the wireless signal receiver within the wireless mouse was developed.

As known, most of the wireless mice having the storable wireless signal receiver are designed on account of their storage functions. Furthermore, in views of user-friendliness, the convenience of inserting/removing the wireless signal receiver into/from the storing portion of the wireless mouse should be taken into consideration.

In views of the above-described disadvantages resulted from the prior art, the applicant keeps on carving unflaggingly to develop an improved wireless mouse according to the present invention through wholehearted experience and research.

SUMMARY OF THE INVENTION

It is an object of the present invention to provide a wireless mouse having a mechanism to facilitate inserting/removing the wireless signal receiver into/from the storing portion of the wireless mouse.

In accordance with an aspect of the present invention, there is provided a wireless mouse. The wireless mouse comprises a housing, a damper and a clasping member. The housing includes an upper cover, two side walls, a lower base and a backdoor. The backdoor is pivotally coupled to the lower base and includes an engaging element. The damper is mounted onto the lower base and includes a rotary member. The rotary member is coaxially rotated with the backdoor. The clasping member is disposed inside the housing. The clasping member comprises two movable clasping parts respectively disposed on the two side walls. Each of the movable clasping parts comprises a hooking element and a button exposed through a hollow portion of the respective side wall. The backdoor is closed when the hooking element is engaged with the engaging element; and the backdoor is detached from the clasping parts in response to a pushing force applied on the buttons.

In accordance with another aspect of the present invention, there is provided a wireless mouse. The wireless mouse comprises a housing, a wireless signal receiver, a carrier and a locking member. The wireless signal receiver is disposed inside the housing. The carrier is movably disposed inside the housing for receiving the wireless signal receiver thereon. The locking member is disposed inside the housing and engaged with the carrier for moving the carrier.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
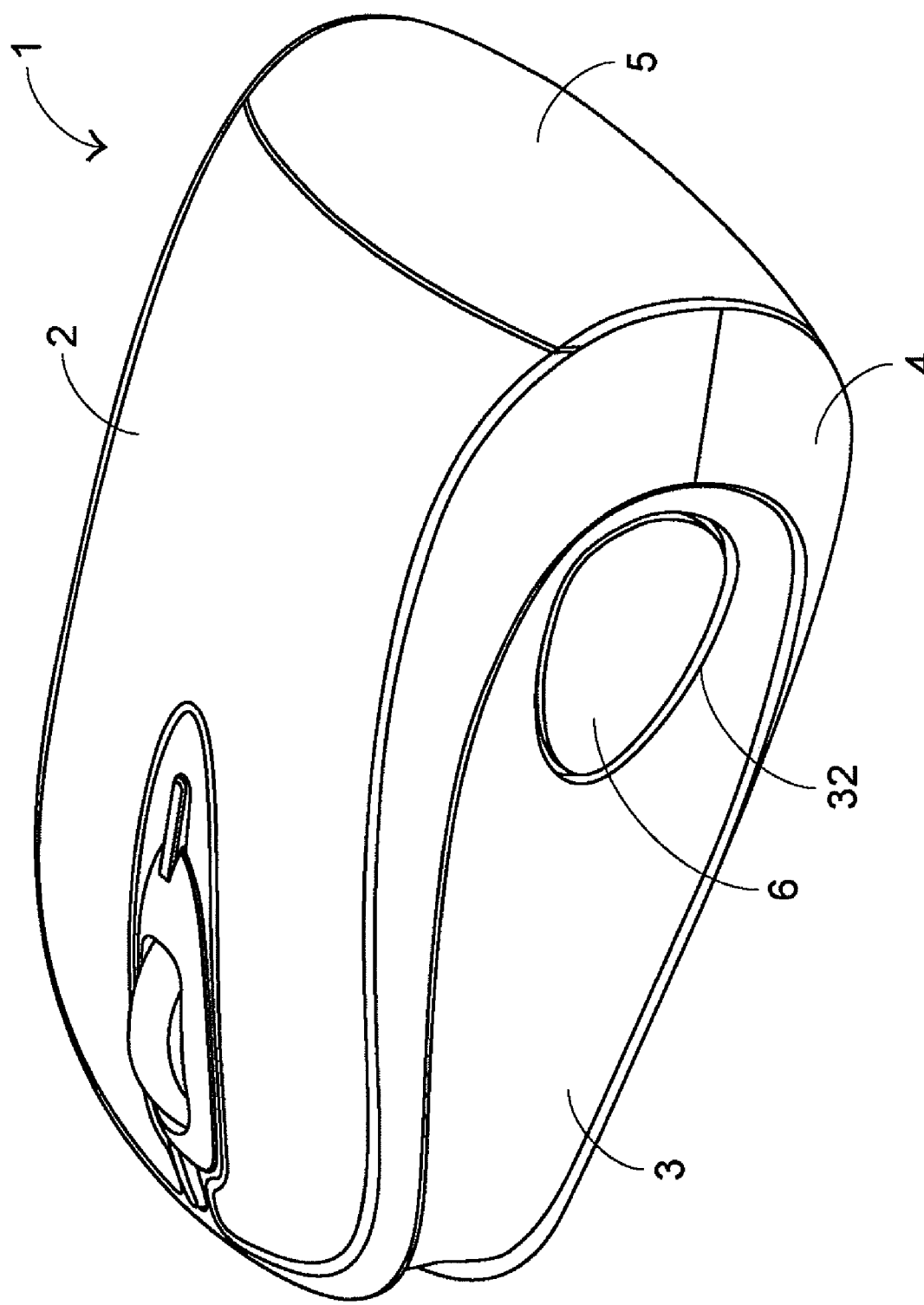
FIG. 1 is a schematic perspective view of a wireless mouse according to a preferred embodiment of the present invention.

Referring to FIG. 1, a schematic perspective view of a wireless mouse according to a preferred embodiment of the present invention is illustrated. The wireless mouse comprises a housing and a clasping member. The clasping member includes two movable clasping parts 6. The housing includes an upper cover 2, two side walls 3, a lower base 4 and a rotatable backdoor 5. Please also refer to FIG. 2. When the backdoor 5 of the wireless mouse 1 is opened, a wireless signal receiver 7 is exposed.

The process of inserting/removing the wireless signal receiver 7 into/from the storing portion of the wireless mouse 1 will be illustrated as follows. During normal operation of the wireless mouse 1, the backdoor 5 is fastened to the movable clasping parts 6 inside the two side walls 3, so that the backdoor 5 is closed. For a purpose of removing the wireless signal receiver 7 from the storing portion inside the wireless mouse 1, the backdoor 5 should be firstly detached from the movable clasping parts 6 in response to a pushing force applied on one of the movable clasping parts 6. Under this circumstance, the backdoor 5 is rotated to expose the storing portion inside the wireless mouse 1. After the wireless signal receiver 7 is taken out, the backdoor 5 can be pushed back again, and thus the backdoor 5 is fastened to the movable clasping parts 6 to restore to its closed status.

The operation principles of the wireless mouse according to this embodiment principally include three major mechanisms, as will be described in more details as follows. The first mechanism involves the means of integrating the backdoor 5 with the lower base 4 while providing the backdoor 5 with rotational ability. The second mechanism involves the means of controlling opening and closing actions of the backdoor 5 by the clasping parts inside the housing. The third mechanism involves the means of slowly rotating the backdoor 5 by using a damper 9.

Figure 3:
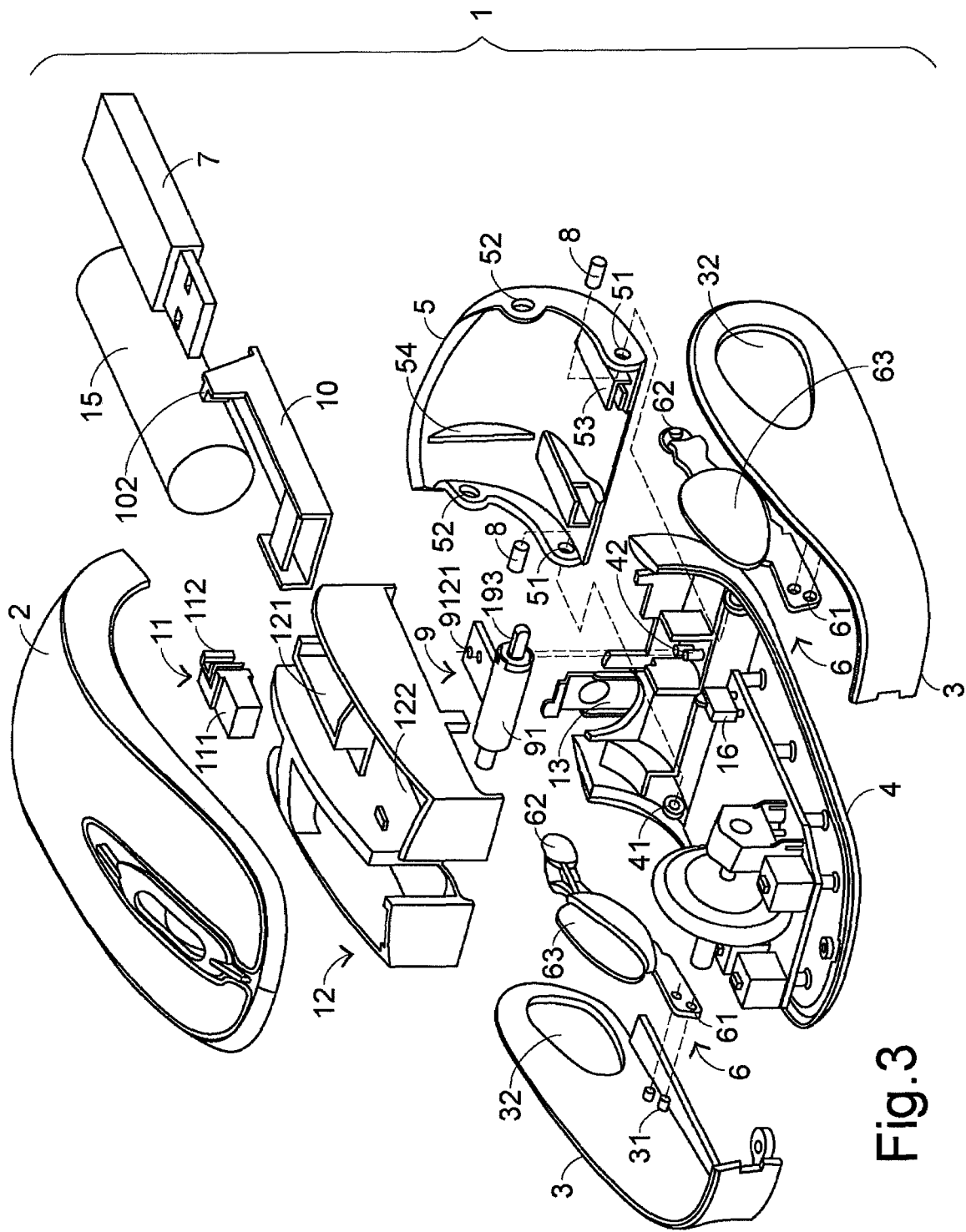
FIG. 3 is a schematic exploded view of the wireless mouse according to the present invention.

Please refer to FIG. 3, which is a schematic exploded view of the wireless mouse. First of all, the mechanism of integrating the backdoor 5 with the lower base 4 and providing the backdoor 5 with rotational ability will be illustrated. The backdoor 5 has a pair of pivotal holes 51 at bilateral sides thereof. The lower base 4 has a pair of pivotal holes 41 corresponding to the pivotal holes 51. A shaft 8 is successively penetrated through respective pivotal hole 51 of the backdoor 5 and respective pivotal hole 41 of the lower base 4, so that the backdoor 5 is integrated with the lower base 4. In this circumstance, the backdoor 5 is pivotally coupled to the lower base 4. It is noted that, however, those skilled in the art will readily observe that numerous modifications and alterations of pivotally coupling the backdoor 5 to the lower base 4 may be made while retaining the teachings of the invention. For example, the protrusion bars (not shown) may be formed on bilateral sides of the lower base 4 and inserted into corresponding pivotal holes 51 of the backdoor 5, such that the backdoor 5 is also pivotally coupled to the lower base 4 with the protrusion bars serving as the shaft. Accordingly, the above disclosure should be limited only by the bounds of the following claims.

Figure 2:
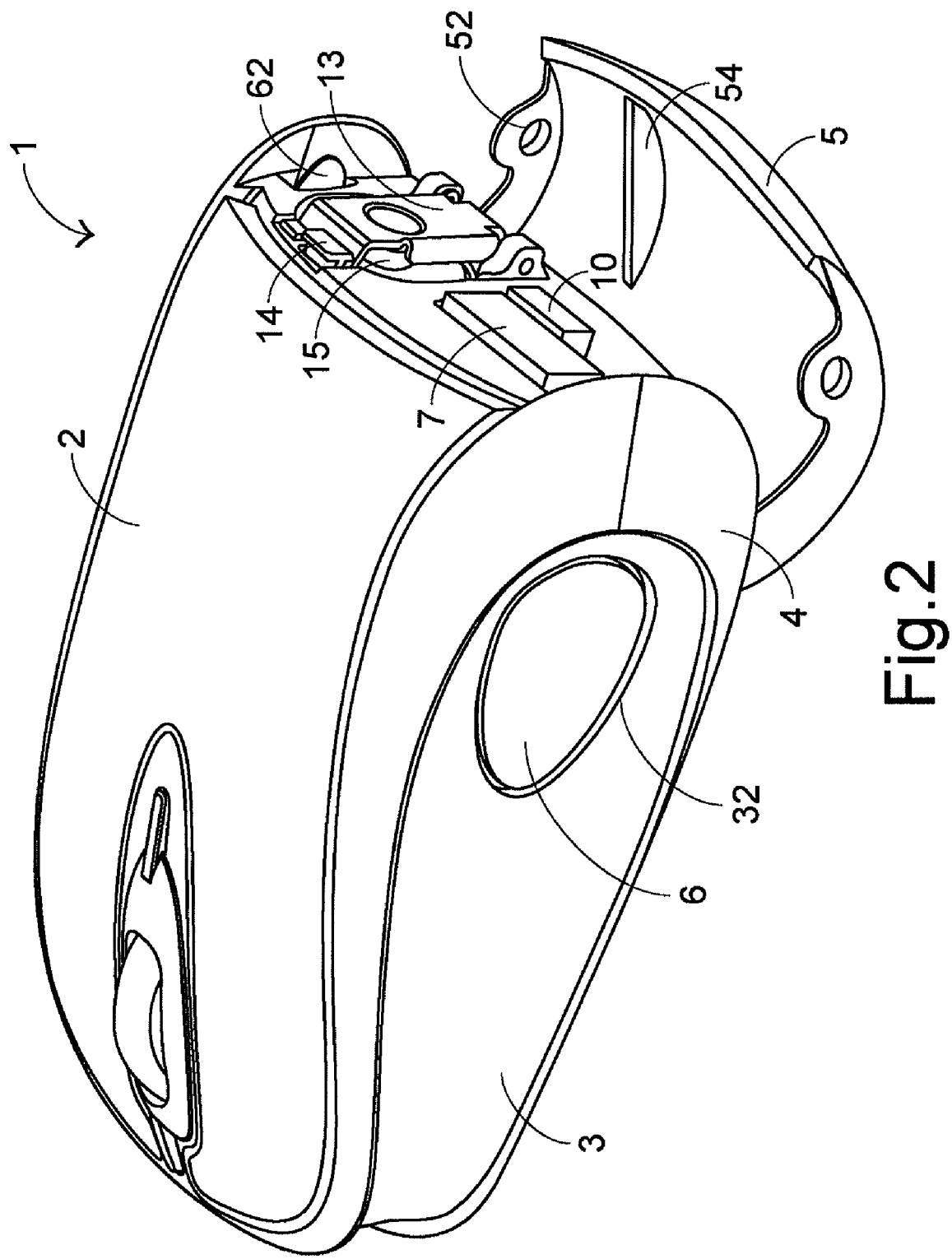
FIG. 2 is a schematic perspective view of the wireless mouse of FIG. 1, in which the backdoor is opened.

Next, the mechanism of controlling opening and closing actions of the backdoor 5 by the clasping parts inside the housing will be illustrated. Please refer to FIG. 2 and FIG. 3. Each movable clasping part 6 includes at least an aperture 61, a hooking element 62 and a button 63. Each side wall 3 has at least a protrusion pillar 31 inserted into corresponding aperture 61, so that the movable clasping part 6 is coupled to the inner side of the side wall 3. In a case that the hooking elements 62 are engaged with the engaging element engaging element, the backdoor 5 is closed. An exemplary engaging element engaging element includes engaging holes 52 (as shown in this embodiment) or recess structures. The buttons 63 are embedded into corresponding hollow portions 32 of the side walls 3, so that the external surfaces of the buttons 63 are exposed. Once a pushing force is exerted on one of the buttons 63, the engagement of the hooking elements 62 and the engaging elements 52 are released. As a consequence, the backdoor 5 is rotated to expose the storing portion inside the wireless mouse 1, as is shown in FIG. 2. It is noted that, however, those skilled in the art will readily observe that numerous modifications and alterations of the engagement between the movable clasping parts 6 and the backdoor 5 may be made while retaining the teachings of the invention. For example, hooking elements (not shown) may be formed on the backdoor 5 to be engaged with the engaging holes formed in the movable clasping parts 6, such that the engagement between the movable clasping parts 6 and the backdoor 5 is rendered. Accordingly, the above disclosure should be limited only by the bounds of the following claims.

Next, the mechanism of slowly rotating the backdoor 5 via the damper 9 will be illustrated. Please also refer to FIG. 3. The damper 9 is arranged inside the wireless mouse and is rotated with the backdoor 5. Once a pushing force is exerted on one of the buttons 63, the damper 9 facilitates slowly opening the backdoor 5. The detailed structure of the damper 9 is illustrated with reference to the exploded view of FIG. 4, as is disclosed in Taiwanese Patent Application No. 94143535.

Figure 4:
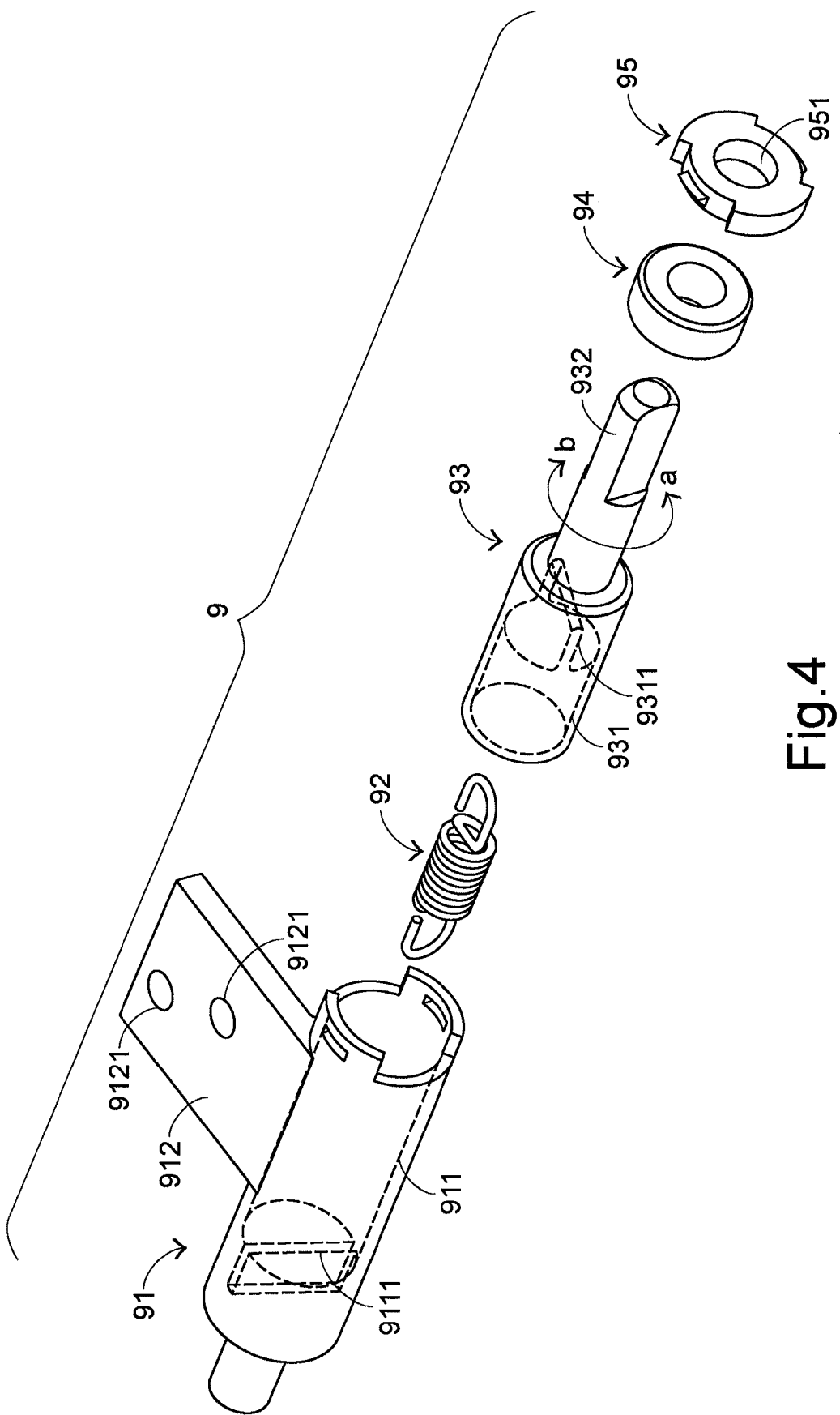
FIG. 4 is a schematic exploded view of a damper used in the wireless mouse of the present invention.

As shown in FIG. 4, the damper 9 comprises a casing 91, a spring 92, a rotary member 93, a rubber ring 94 and an end cap 95. The casing 91 and the rotary member 93 have a first receptacle 911 and a second receptacle 931, respectively. Recess structures 9111 and 9311 are formed within the receptacles 911 and 931 to be engaged with both terminals of the spring 92. The rubber ring 94 is sheathed around the rod body of the rotary member 93 and slightly sustained against the inner wall of the first receptacle 911. Since the rubber ring 94 facilitates providing the rotational resistance, the rotational speed of the rotary member 12 is slowed down upon rotation. The end cap 95 has an opening 951 in the center. After the spring 92, a portion of the rotary member 93 and the rubber ring 94 are accommodated within the first receptacle 911, a portion of the rotary member 93 is penetrated through the opening 951 of the end cap 91, thereby sealing these components within the first receptacle 911. In a case that a torsion force is applied on the spring 92 along the clockwise direction a, the spring 92 is twisted. Whereas, if this torsion force is relieved, the spring 92 will return to its original position so as to drive rotation of the rotary member 93 along the anti-clockwise direction b.

Please refer to FIG. 3 and FIG. 4 again. For mounting this damper 9 onto the wireless mouse 1, the casing 91 further comprises a protrusion plate 912. The protrusion plate 912 has at least a retaining hole 9121 corresponding to the post 42 on the lower base 4. By penetrating the post 42 of the lower base 4 through the retaining hole 9121, the damper 9 is secured onto the wireless mouse 1, and thus the casing 91 will not be shifted upon rotation of the rotary member 93. In addition, the rotary member 93 is linearly aligned with the shafts 8. As a consequence, the rotary member 93 is coaxially rotated with the shafts 8. Furthermore, the rotary member 93 has a prism block formed on the top end thereof to be engaged with a guiding channel 53 of the backdoor 5. During the process of closing the backdoor 5, the rotary member 93 is rotated and thus the spring 92 is twisted. Once a pushing force is exerted on one of the buttons 63, the engagement between the movable clasping parts 6 and the backdoor 5 is eliminated. Meanwhile, the restoring force of the spring 92 will permit reverse rotation of the rotary member 93 to open the backdoor 5.

Please refer to FIG. 3 and FIG. 4 again. Since the rubber ring 94 between the casing 91 and the rotary member 93 is useful to provide the rotational resistance of the rotary member 93, the damper 9 is capable of slowly opening the backdoor 5. It is noted that, however, those skilled in the art will readily observe that numerous modifications and alterations of the damper may be made while retaining the teachings of the invention. For example, the damper disclosed in Taiwanese Patent No. 549376, which uses a viscous fluid to provide viscous shearing resistance to the spring, is also effective to slowly open the backdoor 5. In addition, the rubber ring 94 or the viscous fluid may be omitted, and thus the backdoor 5 is naturally opened by the spring 92.

From the above embodiment, the backdoor can be easily opened when a pushing force is exerted on the movable clasping part. For facilitating inserting/removing the wireless signal receiver into/from the storing portion of the wireless mouse, the wireless mouse of the present invention further includes a carrier and a locking member. After the wireless signal receiver is mounted onto the carrier and the carrier is sustained against the locking member, the carrier and the wireless signal receiver are both stored within the wireless mouse. Whereas, in order to remove the wireless signal receiver from the wireless mouse, the user may press the wireless signal receiver or the carrier such that the carrier is sustained against the locking member again. Meanwhile, the combination of the carrier and the wireless signal receiver is pushed outwardly to a certain distance, and the wireless signal receiver can be removed without difficulty. The operation principles of facilitating inserting/removing the wireless signal receiver into/from the storing portion of the wireless mouse include two major mechanisms, as will be described in more details as follows. The first mechanism involves the means of integrating the carrier and the locking member within the wireless mouse. The second mechanism involves the means of inserting/removing the wireless signal receiver according to the cooperation of the carrier and the locking member.

The detailed structures of the carrier 10 and the locking member 11 will be illustrated with reference to FIG. 3 and FIG. 5. The wireless mouse 1 further comprises a movable carrier 10, a locking member 11 and a supporting member 12. The supporting member 12 has receptacles 121 and 122 for receiving therein the carrier 10 and the locking member 11, respectively. A slit structure 123 is arranged between the receptacles 121 and 122 for facilitating engagement of the carrier 10 and the locking member 11. The carrier 10 has a storing portion 101 for receiving the wireless signal receiver 7 therein and a hooking element 102. The locking member 11 has a main body 111 and an engaging part 112. When the carrier 10 and the locking member 11 are accommodated within the receptacles 121 and 122, the hooking element 102 of the carrier 10 is engaged with the engaging part 112 of the locking member 11 through the slit structure 123.

Please refer to FIG. 5 again. The locking member 11 used in the present invention is disclosed in for example Taiwanese Patent No. M269369. In accordance with a major feature of this locking member 11, the hooking element 102 is engaged with the engaging part 112, the carrier 10 may be located in a retaining state and a withdrawing state in response to two successive pressing actions in the same direction. For example, after the wireless signal receiver 7 is received in the storing portion 101 of the carrier 10, the carrier 10 along with the wireless signal receiver 7 is inserted into the receptacle 122 such that the hooking element 102 of the carrier 10 is sustained against the engaging part 112 of the locking member 11. The engaging part 112 is then drawn back and thus the hooking element 102 and the engaging part 112 are engaged with each other. Meanwhile, the carrier 10 and the wireless signal receiver 7 are both mounted onto the supporting member 12 and stored within the wireless mouse 1. Whereas, in order to facilitate removing the wireless signal receiver 7, the user may press the wireless signal receiver 7 or the carrier 10 such that the hooking element 102 of the carrier 10 is sustained against the engaging part 112 of the locking member 11 again. Meanwhile, in the withdrawing state, the combination of the carrier 10 and the wireless signal receiver 7 will be pushed outwardly to a certain distance. Under this circumstance, the wireless signal receiver 7 which is protruded from the supporting member 12 can be removed without difficulty.

In addition to the function of storing the wireless signal receiver 7, the wireless mouse 1 of the present invention is capable of storing a battery 15 therein. Please refer to FIGS. 2, 3 and 5. The supporting member 12 further includes a battery receiving portion 124, a foldable battery cover 13 and a latch element 14. The battery receiving portion 124 is used for receiving the battery 15 therein. The foldable battery cover 13 and the latch element 14 are coupled to the lower base 4 and the upper cover 2, respectively. After the battery 15 is accommodated within the battery receiving portion 124, the foldable battery cover 13 is closed and engaged with the latch element 14. Meanwhile, the battery 15 is stored within the wireless mouse 1. Whereas, in order to replace the battery with a new one, the latch element 14 is disengaged from the battery cover 13 to expose the battery 15. Moreover, the inner side of the backdoor 5 has a rib structure 54 corresponding to the battery cover 13. During the process of closing the backdoor 5, the battery cover 13 is pushed toward the latch element 14 by the backdoor 5. Under this circumstance, the battery cover 13 is engaged with the latch element 14 so as to assure normal operation of the battery 15.

Figure 5:
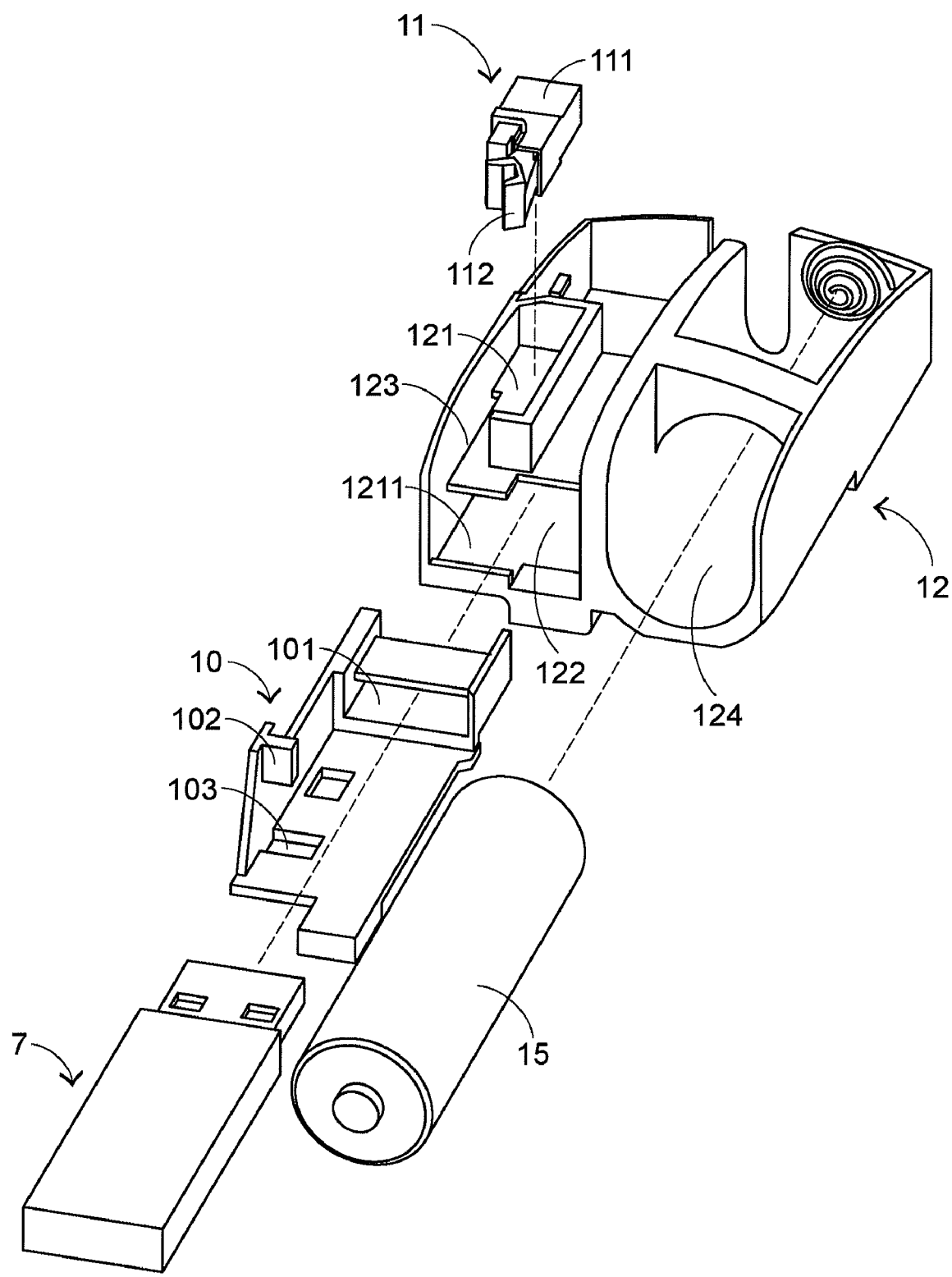
FIG. 5 is a schematic exploded view illustrating the movable carrier, the locking member and the supporting member.
Figure 7:
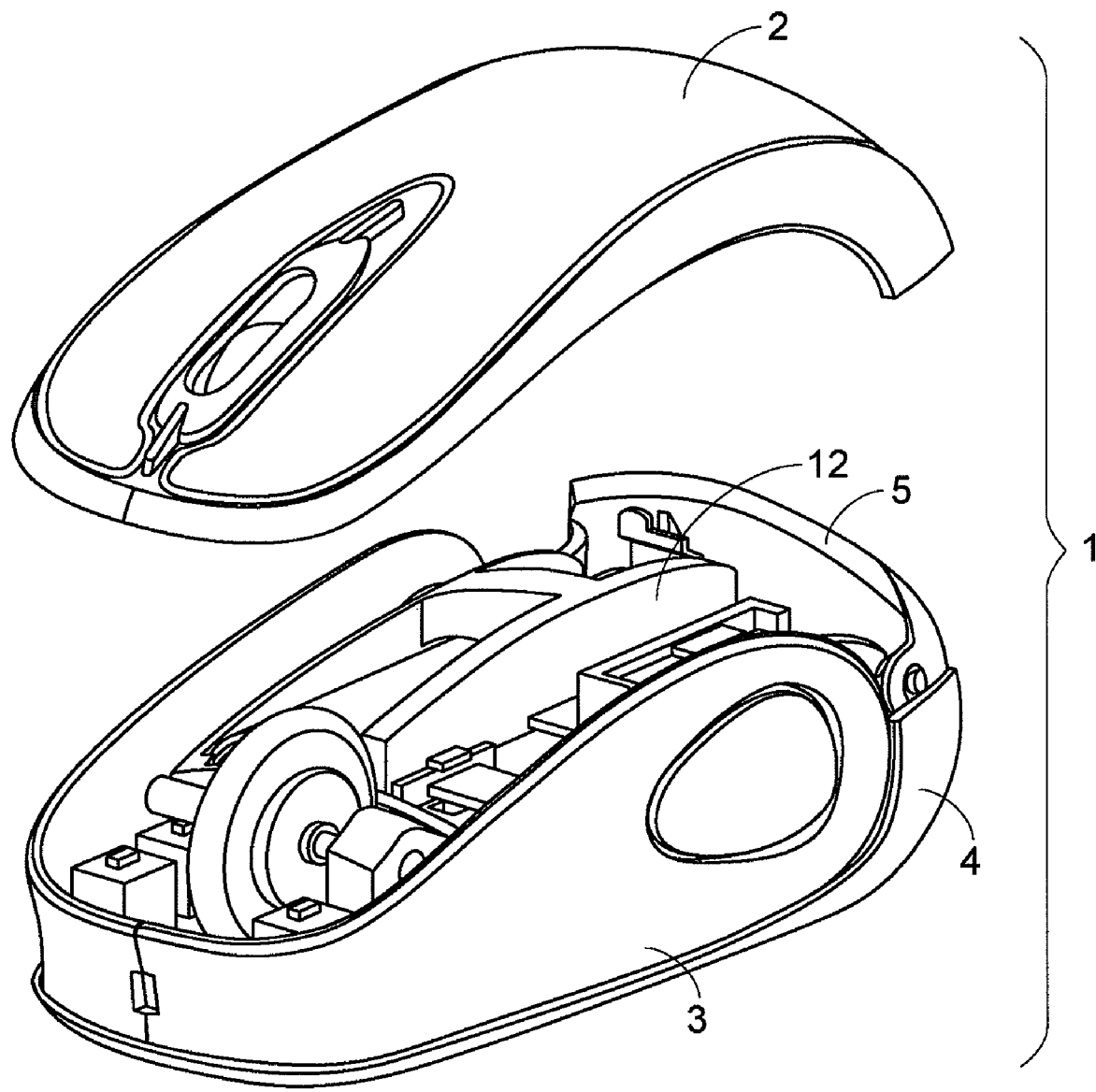

Please refer to FIGS. 3, 5 and 7. The supporting member 12 of the wireless mouse further has a hollow portion 1211 below the receptacle 121. The carrier 10 has an opening 103 under the receptacle 101. When the wireless signal receiver 7 and the carrier 10 are accommodated within the receptacle 121 of the supporting member 12, a power switch element 16 as shown in FIG. 3 is penetrated through the hollow portion 1211 and received in the opening 103 or slightly in contact with the wireless signal receiver 7. Under this circumstance, the power supply of the wireless mouse 1 is interrupted. In contrast, when the wireless signal receiver 7 is removed from the supporting member 12, the bottom surface of the carrier 10 will be sustained against the power switch element 16 to activate the power switch element 16. Meanwhile, the wireless mouse is operated in the power-on state.

Figure 6:
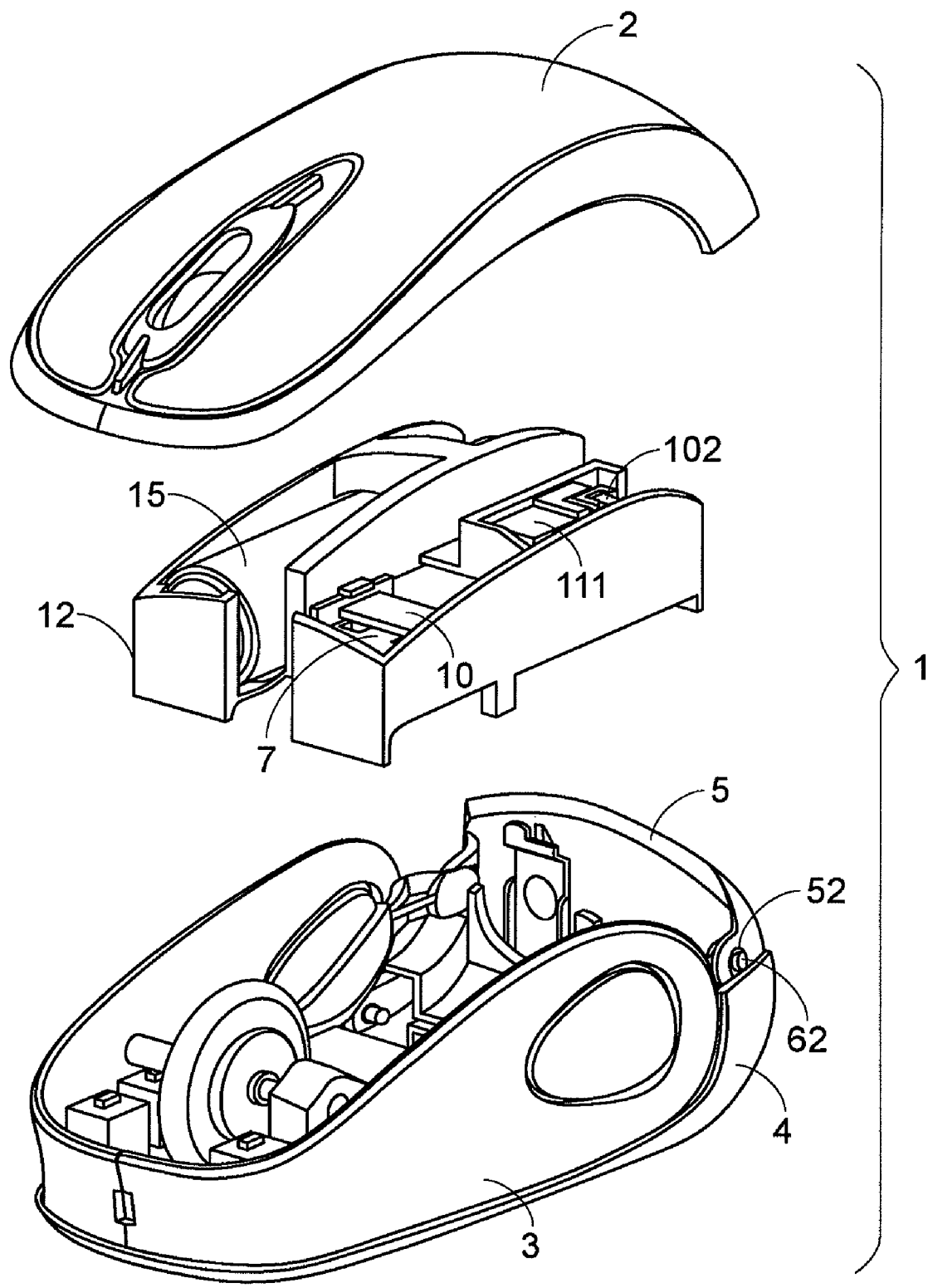
FIGS. 6 and 7 are partially schematic assembled views of the wireless mouse.

The process of assembling the wireless mouse 1 includes several steps as shown in FIG. 3, FIG. 6, FIG. 7 and FIG. 1 successively. Please refer to FIG. 3 and FIG. 6, the backdoor 5 and the side walls 3 are successively integrated into the lower base 4, and the carrier 10, the locking member 11, the battery 15 and the wireless signal receiver 7 are mounted onto the supporting member 12. Then, as shown in FIG. 6 and FIG. 7, the supporting member 12 is mounted onto the lower base 4. Afterward, as shown in FIG. 7 and FIG. 1, the upper cover 2 is mounted on the side walls 3 and the backdoor 5 so as to finish the wireless mouse 1 of the present invention.

Figure 8:
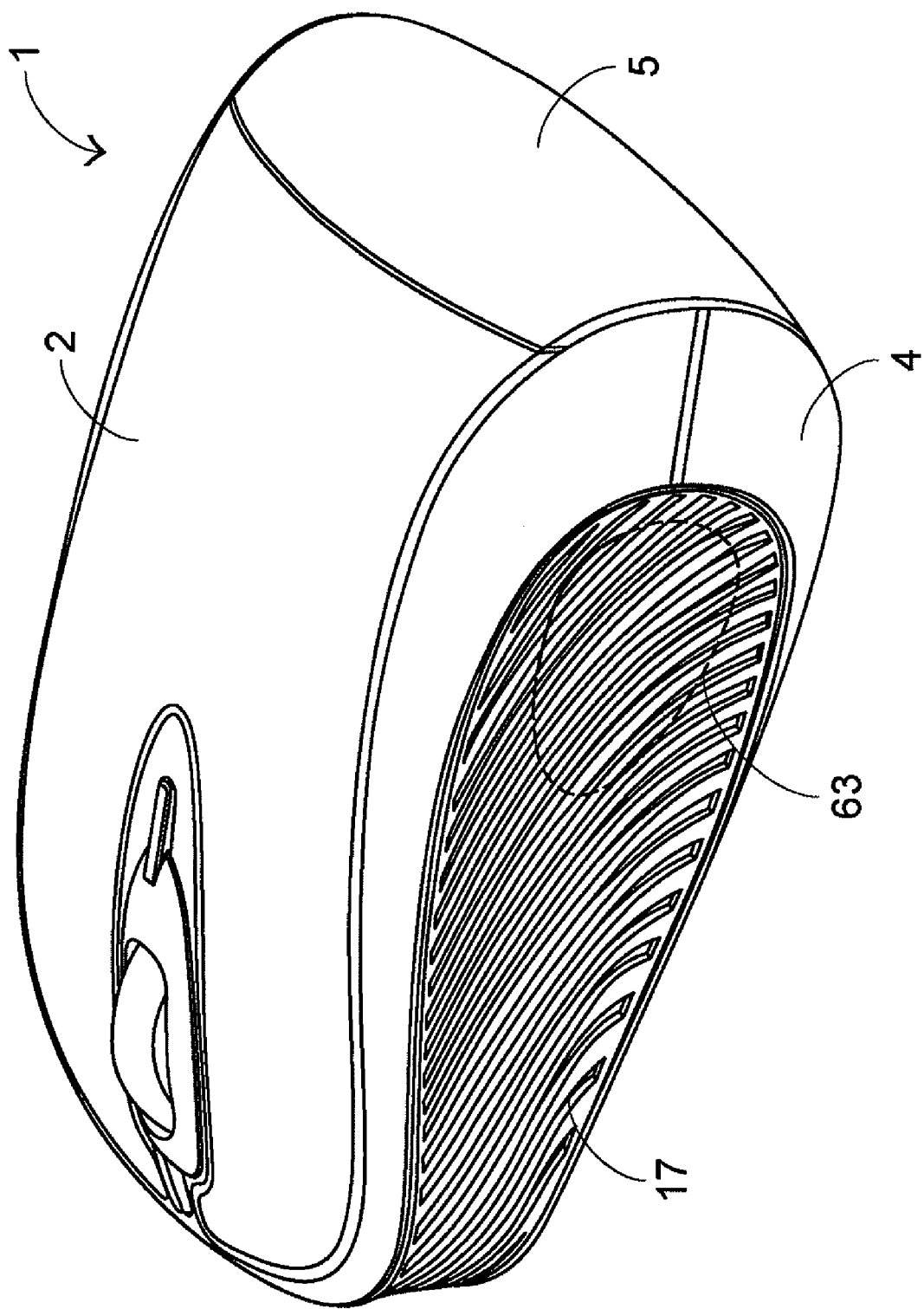
FIG. 8 is a schematic perspective view of a wireless mouse with a rubbery covering according to another preferred embodiment of the present invention.

A further embodiment of a wireless mouse is illustrated in FIG. 8. In this embodiment, most components included therein are similar to those shown in FIG. 1, and are not redundantly described herein. In addition, the wireless mouse 1 of this embodiment further comprises a rubbery covering 17 on the peripheries of the side walls 3 for providing skid resistance. The resilient property of the rubbery covering 17 will not hinder the user from pressing the button 63, and thus the backdoor 5 can be opened without difficulty.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mouse comprising:

a housing including an upper cover, two side walls, a lower base and a backdoor, wherein said backdoor is pivotally coupled to said lower base and includes an engaging element;

a damper mounted onto said lower base and including a rotary member, wherein said rotary member is coaxially rotated with said backdoor; and a clasping member disposed inside said housing, said clasping member comprising two movable clasping parts respectively disposed on said two side walls, wherein each of said movable clasping parts comprises:

a hooking element, wherein said backdoor is closed when said hooking element is engaged with said engaging element; and a button exposed through a hollow portion of said side wall, wherein said backdoor is detached from said movable clasping part in response to a pushing force applied on said button.

2. The wireless mouse according to claim 1 wherein said engaging element includes two engaging holes at bilateral sides of said backdoor, and each of said hooking elements is engaged with respective engaging hole.

3. The wireless mouse according to claim 1 wherein said damper comprises:
   a casing including a receptacle defined therein;
   a spring accommodated with said receptacle and has a first terminal fixed to the inner wall of said receptacle;
   a rotary member having an end accommodated within said receptacle of said casing, wherein a second terminal of said spring is fixed to said rotary member; and
   a rubber ring sheathed around the other end of said rotary member and sustained against the inner wall of said receptacle.

4. The wireless mouse according to claim 1 further comprising a viscous fluid surrounding around said spring.

5. The wireless mouse according to claim 1 wherein said damper comprises:
   a wireless signal receiver;
   a carrier movably disposed inside said housing for receiving said wireless signal receiver thereon; and
   a locking member disposed inside said housing and engaged with said carrier for moving said carrier.

6. A wireless mouse comprising:
   a housing including an upper cover, two side walls, a lower base and a backdoor, wherein said backdoor is pivotally coupled to said lower base and includes an engaging element;
   a damper mounted onto said lower base and including a rotary member, wherein said rotary member is coaxially rotated with said backdoor and said damper comprises:
   a casing including a receptacle defined therein;
   a spring accommodated with said receptacle and has a first terminal fixed to the inner wall of said receptacle;
   a rotary member having an end accommodated within said receptacle of said casing, wherein a second terminal of said spring is fixed to said rotary member; and
   a rubber ring sheathed around the other end of said rotary member and sustained against the inner wall of said receptacle; and
   a clasping member disposed inside said housing, wherein said backdoor is closed when said clasping member is engaged with said engaging element.

* * * * *